United States Patent
Dogu et al.

(10) Patent No.: US 11,785,026 B2
(45) Date of Patent: Oct. 10, 2023

(54) INFORMATION PROCESSING DEVICE, INFORMATION PROCESSING METHOD AND INFORMATION PROCESSING PROGRAM

(71) Applicant: DIGITAL ARTS INC., Tokyo (JP)

(72) Inventors: Toshio Dogu, Tokyo (JP); Takuya Matsumoto, Tokyo (JP); Mitsunari Satoh, Tokyo (JP)

(73) Assignee: DIGITAL ARTS INC., Tokyo (JP)

( * ) Notice: Subject to any disclaimer, the term of this patent is extended or adjusted under 35 U.S.C. 154(b) by 187 days.

(21) Appl. No.: 17/268,279

(22) PCT Filed: Aug. 14, 2019

(86) PCT No.: PCT/JP2019/031960
§ 371 (c)(1),
(2) Date: Feb. 12, 2021

(87) PCT Pub. No.: WO2020/036201
PCT Pub. Date: Feb. 20, 2020

(65) Prior Publication Data
US 2021/0320930 A1  Oct. 14, 2021

(30) Foreign Application Priority Data
Aug. 14, 2018  (JP) .................................. 2018-152773

(51) Int. Cl.
*H04L 29/00* (2006.01)
*H04L 9/40* (2022.01)
*G06F 21/56* (2013.01)

(52) U.S. Cl.
CPC .......... *H04L 63/1416* (2013.01); *G06F 21/56* (2013.01); *H04L 63/0876* (2013.01); *H04L 63/1483* (2013.01)

(58) Field of Classification Search
CPC ............ H04L 63/1416; H04L 63/0876; H04L 63/1483; H04L 51/212; H04L 63/126; G06F 21/56; G06F 21/305
See application file for complete search history.

(56) References Cited

U.S. PATENT DOCUMENTS 7,873,996 B1 *  1/2011  Emigh .................. H04L 51/212
                                                  726/22
8,392,357 B1    3/2013  Zou et al.
(Continued)

FOREIGN PATENT DOCUMENTS

| EP | 1093691 B1 | 3/2005 |
| JP | 2012078922 A | 4/2012 |
| JP | 2017028368 A | 2/2017 |

OTHER PUBLICATIONS

International Search Report from PCT/JP2019/031960, dated Oct. 21, 2019, with English translation from WIPO.
(Continued)

*Primary Examiner* — Don G Zhao
(74) *Attorney, Agent, or Firm* — Ladas & Parry, LLP

(57) ABSTRACT

An information processing device 10 comprises a data reception unit 13 that accepts transmission information of an email received by each of a plurality of mail servers 12, the transmission information being extracted from the emails; a transmission information determination unit 14 that determines whether the transmission source of the email is appropriate based on the transmission information; and a whitelist distribution unit 16 that distributes the transmission source determined to be appropriate to each of the plurality of mail servers.

8 Claims, 7 Drawing Sheets

(56) References Cited

U.S. PATENT DOCUMENTS

| | | | |
|---|---|---|---|
| 10,050,998 B1* | 8/2018 | Singh | H04L 63/145 |
| 2005/0015455 A1 | 1/2005 | Liu | |
| 2006/0168028 A1* | 7/2006 | Duxbury | H04L 63/1466 |
| | | | 709/206 |
| 2009/0307320 A1 | 12/2009 | Golan et al. | |
| 2014/0373145 A1* | 12/2014 | Wardman | H04L 51/212 |
| | | | 726/23 |
| 2017/0019354 A1* | 1/2017 | Sagae | H04L 63/08 |
| 2018/0375886 A1* | 12/2018 | Kirti | H04L 63/1425 |
| 2019/0068627 A1* | 2/2019 | Thampy | H04W 12/12 |
| 2019/0104154 A1* | 4/2019 | Kumar | G06N 20/00 |
| 2019/0141057 A1* | 5/2019 | Burgis | G06F 21/554 |
| 2019/0370152 A1* | 12/2019 | Godefroid | G06F 11/3664 |

OTHER PUBLICATIONS

Written Opinion of the International Searching Authority from PCT/JP2019/031960, dated Oct. 21, 2019, with English translation from WIPO.
International Preliminary Report on Patentability from PCT/JP2019/031960, dated Feb. 16, 2021, with English translation from WIPO.
Digital Arts, "i-Filter m-Filter", Forefront of Software, PC—Webzine, Aug. 25, 2017, vol. 307, pp. 42-43, with machine English translation.
Supplementary European Search Report for European Patent Application 19850702.2 dated Mar. 21, 2022.

* cited by examiner

FIG. 2

TRANSMISSION INFORMATION

| TRANSMISSION SOURCE MAIL ADDRESS (Envelope From) | TRANSMISSION SOURCE IP ADDRESS | TRANSMISSION TIME | SUBJECT | LINK DESTINATION | DISGUISE DETERMINATION RESULT | ATTACHED FILE NAME |
|---|---|---|---|---|---|---|
| XXX@aaa.co.jp | 178.50.1.x | d1/m1/2018 8:51 | ABOUT XX | http://・・/a.html | ○ | s1.pdf |
| XXX@bbb.co.jp | 178.60.1.y | d2/m2/2018 12:00 | ABOUT YY | http://・・/b.html | ○ | s2.pdf |
| XXX@ccc.co.jp | 178.70.1.z | d2/m2/2018 13:45 | ABOUT ZZ | http://・・/c.html | ○ | s3.pdf |
| ... | ... | ... | ... | ... | ... | ... |

FIG. 3

| TRANSMISSION SOURCE MAIL ADDRESS (Envelope From) | TRANSMISSION SOURCE IP ADDRESS | RECEPTION TIME | SUBJECT | LINK DESTINATION | ATTACHED FILE NAME | DISGUISE DETERMINATION RESULT | WHITE DETERMINATION |
|---|---|---|---|---|---|---|---|
| XXX@aaa.co.jp | 178.50.1.x | d1/m1/2018 8:51 | ABOUT XX | http://.../a.html | s1.pdf | ○ | × |
| XXX@bbb.co.jp | 178.60.1.y | d2/m2/2018 12:00 | ABOUT YY | http://.../b.html | s2.pdf | ○ | ○ |
| XXX@ccc.co.jp | 178.70.1.z | d2/m2/2018 13:45 | ABOUT ZZ | http://.../c.html | s3.pdf | ○ | ○ |
| ... | ... | ... | ... | ... | ... | ... | ... |

▓ DATA MATCHING MALICIOUS INFORMATION

FIG. 4

WHITE TRANSMISSION SOURCES

| No. | DOMAIN | TRANSMISSION SOURCE IP ADDRESS |
|---|---|---|
| NO. 1 | aaa. co. jp | 172. 1681. 1. 2 |
| NO. 2 | bbb. co. jp | 172. 1681. 1. 2 |
| NO. 3 | ccc. co. jp | 172. 1681. 1. 0/28 |
| . . . | . . . | . . . |

INFORMATION PROCESSING DEVICE, INFORMATION PROCESSING METHOD AND INFORMATION PROCESSING PROGRAM

CROSS-REFERENCE TO RELATED APPLICATIONS

The present application is the U.S. national phase of PCT Application No. PCT/JP2019/031960 filed on Aug. 14, 2019, which claims the benefit and priority to Japanese Application No. 2018-152773 filed on Aug. 14, 2018, the disclosures of which are incorporated herein by reference in their entireties.

TECHNICAL FIELD

The embodiment of the present invention relates to information processing device, information processing method and information processing program.

BACKGROUND ART

In recent years, there have been increasing targeted email attacks of sending an email from a disguised transmission source mail address to a specific person for the purpose of causing the person to access an attached file or a link destination so that their terminal becomes infected with a virus or the like.

Conventionally, as techniques for handling emails from disguised transmission sources, so called "spoofed" emails, transmission source domain authentication technologies such as Sender Policy Framework (SPF) authentication, DomainKeys Identified Mail (DKIM), Domain-based Message Authentication, Reporting & Conformance (DMARC) have been widely used.

In SPF authentication, combinations of domains of transmission source mail addresses and transmission source IP addresses are registered in advance as appropriate email transmission sources in an authentication server, and upon reception of an email at a mail server, an inquiry about the domain corresponding to the transmission source of the email and the transmission source IP address is made to the authentication server to authenticate whether the email transmission source is appropriate.

CITATION LIST

Patent Literature

Patent Literature 1: JP 2012-78922 A

SUMMARY OF INVENTION

Problem to be Solved by Invention

In the mail authentication system that requires preliminary registration of combinations of transmission source domains and IP addresses, as in the above-mentioned transmission source domain authentication technology, the registered corporations and organizations are limited, so there is a limit to the scope of the authentication. In addition, if either the transmission source domain or the transmission source IP address is changed due to the replacement of the mail system or the like, a combination of the transmission source domain and the transmission source IP address needs to be registered again for matched authentication. For this reason, in some cases, it is not possible to keep up with changes in the transmission source domain and the transmission source IP address.

Furthermore, with the conventional transmission source domain authentication technology, if a malicious third party themselves registers a combination of a transmission source domain and IP address in the authentication server, an email from the malicious third party will be received with a matched authentication result.

The present invention has been made in consideration of such circumstances. An object of the present invention is to provide an information processing device, an information processing method, and an information processing program that allow for swift and extensive collection of appropriate email transmission sources and prevent fraudulent activities such as email spoofing.

Means for Solving Problem

An information processing device according to an embodiment of the present invention comprises: a data reception unit that accepts transmission information of an email received by each of a plurality of mail servers, the transmission information being extracted from the emails; a transmission information determination unit that determines whether the transmission source of the email is appropriate based on the transmission information; and a whitelist distribution unit that distributes the transmission source determined to be appropriate to each of the plurality of mail servers.

Effect of Invention

An information processing device, an information processing method, and an information processing program that allow for swift and extensive collection of appropriate email transmission sources and prevent fraudulent activities such as email spoofing are provided by an embodiment of the present invention.

BRIEF DESCRIPTION OF DRAWINGS

FIG. 2 is an explanatory diagram that illustrates an example of transmission information extracted from emails.

FIG. 3 is an explanatory diagram that illustrates an example of results of determination by a transmission information determination unit on whether transmission information extracted from emails indicates an appropriate transmission source.

FIG. 4 is an explanatory diagram that illustrates an example of a list of white transmission sources.

DESCRIPTION OF EMBODIMENTS

Hereinafter, embodiments of the present invention will be described with reference to the accompanying drawings.

Figure 1:
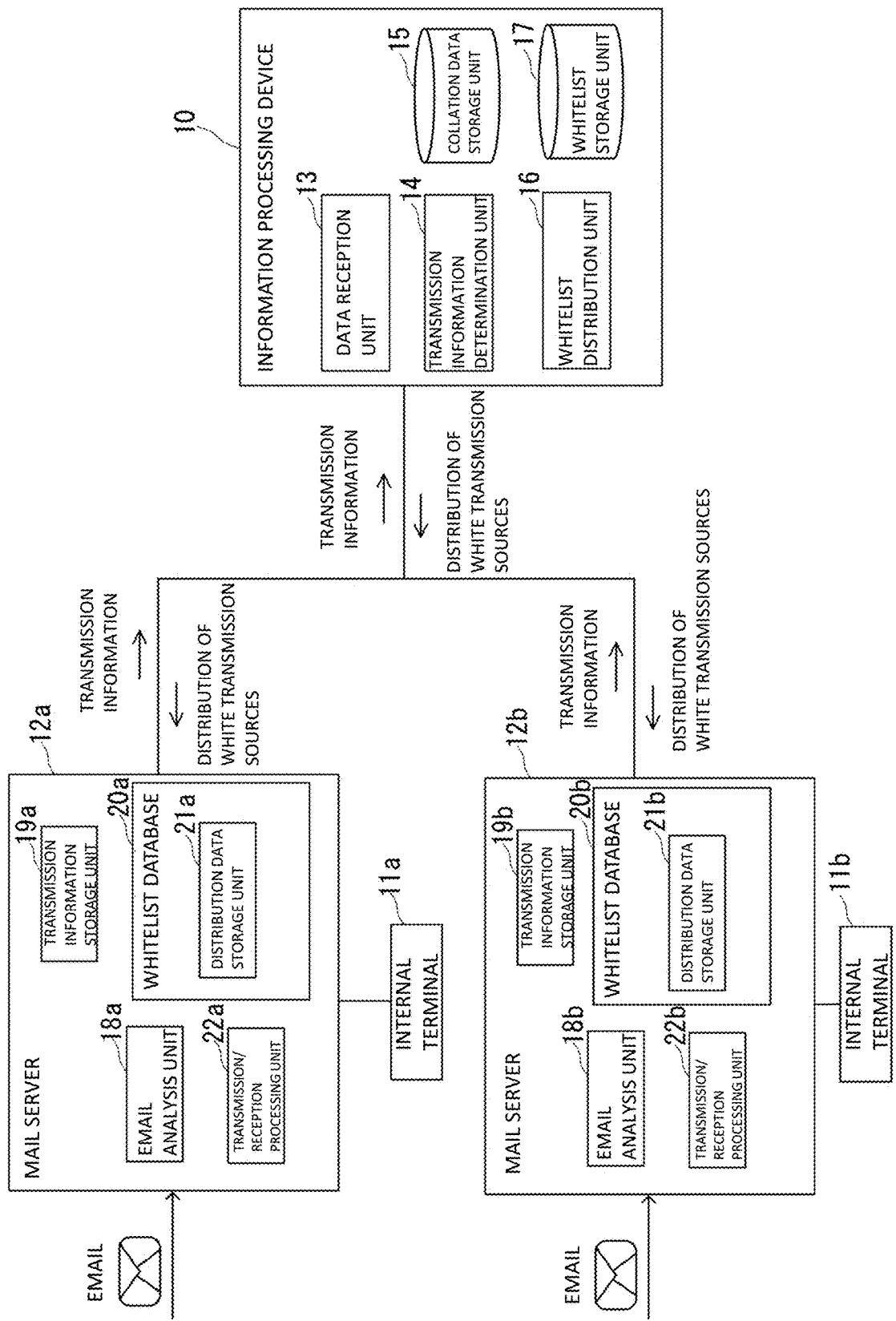
FIG. 1 is a configuration diagram that illustrates an example of a configuration of an email system to which an information processing device according to a first embodiment is applied.

FIG. 1 is a configuration diagram that illustrates an example of a configuration of an email system to which an information processing device 10 according to a first embodiment is applied.

A mail server 12 is a server that receives emails from an external terminal (not shown) via an external mail server and transmits the received emails to an internal terminal 11. The mail server 12 is provided, for example, at the boundary (demilitarized zone (DMZ)) between an internal network where connection from the Internet is restricted and an external network that can connect to the Internet arbitrarily.

The internal terminal 11 is a client terminal that receives emails from the mail server 12.

In this example, the email system is configured with two mail servers 12 (12*a* and 12*b*) and internal terminals 11*a* and 11*b* as respective terminals to receive emails from the mail servers 12*a* and 12*b*. Otherwise, the email system may be configured with more mail servers 12 and internal terminals 11, and the numbers and arrangements of the mail servers 12 and the internal terminals 11 are not limited to those illustrated in FIG. 1.

The mail server 12 includes an email analysis unit 18, a transmission information storage unit 19, a whitelist database 20, and a transmission/reception processing unit 22.

The email analysis unit 18 extracts transmission information from an email received from the external terminal via the external mail server, and analyzes the email based on the transmission information. The transmission information is various kinds of information related to mail transmission extracted from an email, which includes transmission source mail address (envelope from), transmission source IP address described in the mail header, transmission time, mail subject, link destination described in mail body, attached file name, attached file name, file extension, and the like. The transmission source IP address may be specified, out of IP address (received from) described in the mail header, from the transmission source IP address of the external mail server preceding the mail server 12 managed in the internal network where connection from the Internet is limited, or may be specified using the IP address of a connection command transmitted from a server preceding the mail server 12.

Based on the extracted transmission information, the email analysis unit 18 analyzes whether the received email is a harmful mail in which the transmission source of the email is disguised by a malicious third party. Specifically, for example, the email analysis unit 18 determines whether the transmission source mail address (envelope from) and the transmission source address in the mail header match each other, and if they do not match, determines that the transmission source is disguised. Otherwise, the disguise of the transmission source may be determined by storing mail text that is assumed to be disguised in advance and collating the body of the email with the mail text.

The transmission information storage unit 19 stores the transmission information extracted by the email analysis unit 18 in association with information for identifying each of the internal terminals 11 to receive emails (for example, the IP address and email address of the internal terminal 11). The transmission information is transmitted to the information processing device 10 each time it is stored in the transmission information storage unit 19. Alternatively, the transmission information may be transmitted to the information processing device 10 on a regular basis (for example, every two hours).

FIG. 2 is an explanatory diagram that illustrates an example of transmission information extracted from emails.

As illustrated in FIG. 2, the transmission information stored in the transmission information storage unit 19 include the transmission source mail address, the transmission source IP address, the transmission time, the mail subject, the link destination described in the mail body, and the file name of the attached file. The result of determination executed by the email analysis unit 18 on whether the email is disguised may be added as the transmission information.

The whitelist database 20 is a database in which a list of combinations of the domain of transmission source mail address and transmission source IP address, which are appropriate as email transmission sources (there is no risk of disguised mail), is stored in advance. The whitelist database 20 has a distribution data storage unit 21 in which stored are combinations of domains of transmission source mail address and transmission source IP addresses distributed from the information processing device 10. Note that the details of the domain and the transmission source IP address corresponding to a white transmission source (appropriate as transmission source) distributed from the information processing device 10 and stored in the distribution data storage unit 21 will be described later.

The transmission/reception processing unit 22 executes control of transmission of the received email to the internal terminal 11 and the like. Specifically, if the domain of the transmission source mail address of the email and the transmission source IP address match a combination in the transmission source list described in the whitelist database 20, the transmission/reception processing unit 22 determines the transmission source as appropriate and transmits the email to the internal terminal 11. On the other hand, if they do not match any combination in the transmission source list described in the whitelist database 20, the transmission/reception processing unit 22 controls the transmission of the email based on the result of analysis by the email analysis unit 18 on whether the email is a disguised mail. For example, if determining the email to be disguised, the transmission/reception processing unit 22 quarantines the email inside the mail server 12 without transmitting it to the internal terminal 11. This avoids the risk that the internal terminal 11 having received the email becomes infected with a virus or the like, thereby ensuring the safety of the terminal.

Domains that can be used not only by corporations and organizations but also by individuals, such as free mail domains and domains under the jurisdiction of providers, are likely to be used for targeted mails, and thus it is desirable to exclude such domains from white transmission sources stored in the whitelist database 20. Private domains may be stored separately from the whitelist database 20.

The information processing device 10 according to the first embodiment accepts transmission information extracted from emails received by a plurality of mail servers 12, determines whether the transmission sources are appropriate based on the transmission information, and distributes the transmission sources having been determined as appropriate to each of the mail servers 12.

The information processing device 10 acquires transmission information transmitted from the plurality of mail servers 12. The information processing device 10 may acquire transmission information directly from the plurality of mail servers 12, or may acquire transmission information via a separate server that collects transmission information.

Note that the information processing device 10 may be composed of one device or may be composed of a plurality of devices. When the information processing device 10 is composed of a plurality of devices, the devices constituting the information processing device 10 may be installed in different rooms or different places, and a part of the information processing device 10 and the rest of the information processing device 10 may be located in remote areas.

The information processing device 10 includes a data reception unit 13, a transmission information determination unit 14, a collation data storage unit 15, and a whitelist distribution unit 16.

The functions of the units constituting the information processing device 10 may be implemented by executing predetermined program codes with the use of a processor. Instead of such software processing, the functions may be implemented, for example, by hardware processing using ASIC or the like, or by a combination of software processing and hardware processing.

The data reception unit 13 accepts, from each of the plurality of mail servers 12, the transmission information of the emails extracted from the emails received by the mail server 12.

The collation data storage unit 15 is a database in which malicious information harmful to the internal terminals 11 is stored in advance for each of the transmission information of the emails. For example, stored in the collation data storage unit 15 are harmful IP addresses and link destination URLs that guide the internal terminals 11 to download malicious files or connect to websites, and domains of transmission source mail addresses at which mails may have been disguised, IP addresses, subjects, attached file names, and attached file names, file extensions, and the like.

The transmission information determination unit 14 determines whether the transmission source of the email is appropriate based on the transmission information of the email. The transmission information determination unit 14 collates the accepted transmission information with the malicious information stored in the collation data storage unit 15. If the accepted transmission information does not match the malicious information, the transmission information determination unit 14 determines the domain of the transmission source mail address and the transmission source IP address in the transmission information as an appropriate transmission source. On the other hand, if the received transmission information matches the malicious information, the transmission information determination unit 14 does not determine them as an appropriate transmission source.

In addition, if there is a match among the domain of the transmission source mail address and the transmission source IP address included in the transmission information accepted from the plurality of mail servers 12, the transmission information determination unit 14 may determine the domain of the transmission source mail address and the transmission source IP address to be appropriate. For example, a reference value (for example, three or more mail servers 12) is set for mail servers 12 from which the transmission information is accepted, and if the domain of the transmission source mail address and the transmission source IP address match each other in the transmission information received from the mail servers 12 exceeding the reference value, the transmission information determination unit 14 determines the domain of the transmission source mail address and the transmission source IP address to be appropriate. The transmission information determination unit 14 may determine the domain of the transmission source mail address and the transmission source IP address to be appropriate if the result of determination on the disguise of the email is positive (the transmission information having the determination result that the email has not been disguised) and the domain of the transmission source mail address and the transmission source IP address match each other in the transmission information accepted from the plurality of mail servers 12.

If the attached file name and the extension included in the transmission information accepted from the plurality of mail servers 12 match among the transmission information, the transmission information determination unit 14 may determine that the transmission information is suspected of having been extracted from a suspicious email and determine the domain of the transmission source mail address and the transmission source IP address included in the transmission information to be an inappropriate transmission source.

The collation data storage unit 15 may store various types of transmission information that are not determined to be an appropriate transmission source by the transmission information determination unit 14 as malicious information.

FIG. 3 is an explanatory diagram that illustrates an example of results of determination on whether the transmission sources of emails are appropriate based on the transmission information of the emails. The transmission information determination unit 14 determines whether each of the transmission sources is appropriate by collating the accepted transmission information with the malicious information stored in the collation data storage unit 15.

As illustrated in FIG. 3, if there exists "http:// . . . /a.html" as a link destination in the transmission information of the email corresponding to the transmission source IP address "178.50.1.x" and this link destination matches malicious information, the transmission information determination unit 14 determines the transmission source corresponding to the transmission information to be inappropriate. On the other hand, if each of the transmission information of the emails of which the transmission source IP address corresponds to "178.60.1.y" does not match malicious information, the transmission information determination unit 14 determines the domain of the transmission source mail address and the transmission source IP address corresponding to the transmission information to be an appropriate transmission source, that is, a white transmission source.

A whitelist storage unit 17 has the transmission sources determined to be appropriate stored therein. The whitelist storage unit 17 accumulates the transmission sources determined to be appropriate. The transmission sources stored in the whitelist storage unit 17 may be collated with the malicious information in the collation data storage unit 15 as necessary, and the results of determination on whether the transmission source is appropriate may be updated.

The whitelist distribution unit 16 distributes the transmission sources determined to be appropriate by the transmission information determination unit 14 to each of the plurality of mail servers 12. Each of the mail servers 12 stores the delivered transmission sources (domains of the mail addresses and the transmission source IP addresses) in the distribution data storage unit 21. The whitelist distribution unit 16 may distribute a transmission source determined to be appropriate to each of the plurality of mail servers 12 at each time of collection, or may distribute all the data of the transmission sources stored in the whitelist storage unit 17 at regular intervals. Otherwise, the information processing device 10 may accept a distribution request from the mail server 12 and distribute all the data of the transmission sources stored in the whitelist storage unit 17.

The whitelist distribution unit 16 may also distribute the malicious information stored in the collation data storage unit 15 together with the transmission sources stored in the whitelist storage unit 17 to each of the mail servers 12. The email analysis unit 18 of the mail server 12 may perform disguise analysis using the distributed malicious information.

FIG. 4 is an explanatory diagram that illustrates an example of a whitelist stored in the whitelist database 20 (20*a*, 20*b*). Stored in advance in the whitelist database 20 are combinations of the domains of the transmission source mail address and the transmission source IP addresses determined to be appropriate as transmission sources. Every time a combination is distributed from the whitelist distribution unit 16, it is newly stored as an appropriate transmission source.

Subsequently, the operations of the information processing device 10 according to the first embodiment will be described.

Figure 5:
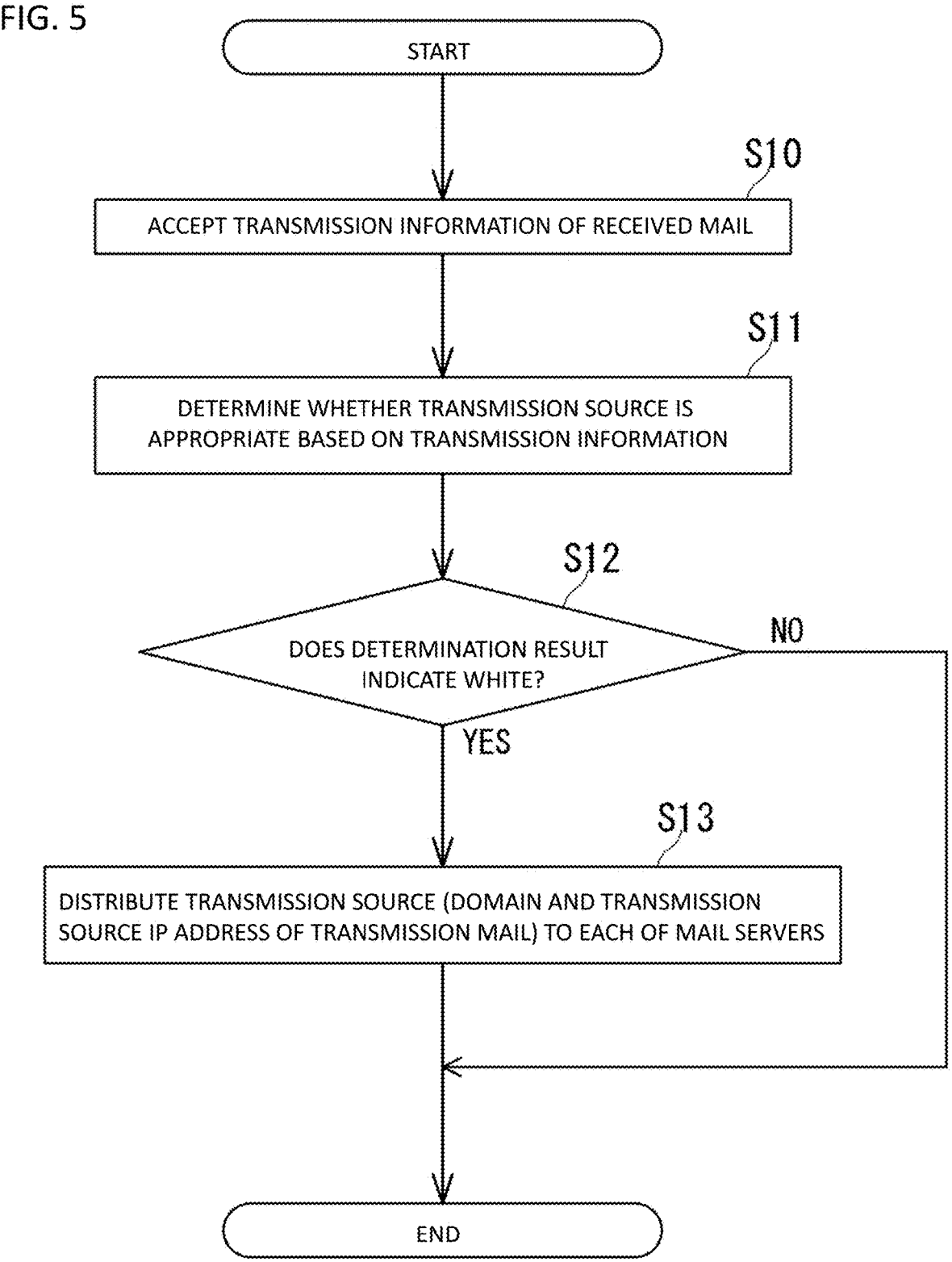
FIG. 5 is a flowchart that illustrates an example of an information processing method according to the first embodiment.

FIG. 5 is a flowchart that illustrates an example of an information processing method according to the first embodiment (see FIG. 1 as appropriate).

The data reception unit 13 accepts, from each of the plurality of mail servers 12, the transmission information of the emails extracted from the emails received by the mail server 12 (S10).

The transmission information determination unit 14 collates the accepted email transmission information with the malicious information stored in the collation data storage unit 15 and determines whether the transmission source of the email is appropriate (S11).

Then, if the transmission information of the accepted email does not match the malicious information, the transmission information determination unit 14 determines the domain of the transmission source mail address and the transmission source IP address in the transmission information to be an appropriate transmission source (S12: YES). On the other hand, if the accepted transmission information of the email matches the malicious information, the transmission information determination unit 14 does not determine them to be an appropriate transmission source (S12: NO).

The whitelist distribution unit 16 distributes the transmission sources determined to be appropriate by the transmission information determination unit 14 to each of the plurality of mail servers 12 (S13). The whitelist distribution unit 16 may distribute all the data of the transmission sources stored in the whitelist storage unit 17 at regular intervals.

As described above, the information processing device 10 according to the first embodiment can quickly and widely collect appropriate transmission sources of emails. The capability of widely collecting appropriate transmission sources of emails in a short period of time prevents fraudulent acts such as spoofing of emails.

If the combinations of domains of transmission source mail addresses and IP addresses change due to the replacement of the mail system or the change of domain information, the administrator of each mail server needs to register again the changed combinations of domains and transmission source IP addresses in SPF authentication or the like.

On the other hand, in the present embodiment, by collecting and distributing white transmission sources based on the transmission information of emails actually received by the plurality of mail servers 12, even if the combinations of domains of transmission source mail addresses and IP addresses change, it is possible to quickly use the latest appropriate transmission sources without the administrator of each mail server having to register in advance the combinations of domains and transmission source IP addresses in a DNS server as in SPF authentication, for example. In other words, by updating the white transmission sources based on the transmission information of the actually received emails, it is possible to follow the change of the domains and the transmission source IP addresses, so that the white transmission source list can be kept in the latest state. In addition, unlike in SPF authentication, a malicious third party cannot register a combination of domain of a mail address and a transmission source IP address as a transmission source, so that it is possible to prevent emails received from the malicious third party from being determined to be an appropriate transmission source on the mail server 12.

Second Embodiment

Figure 6:
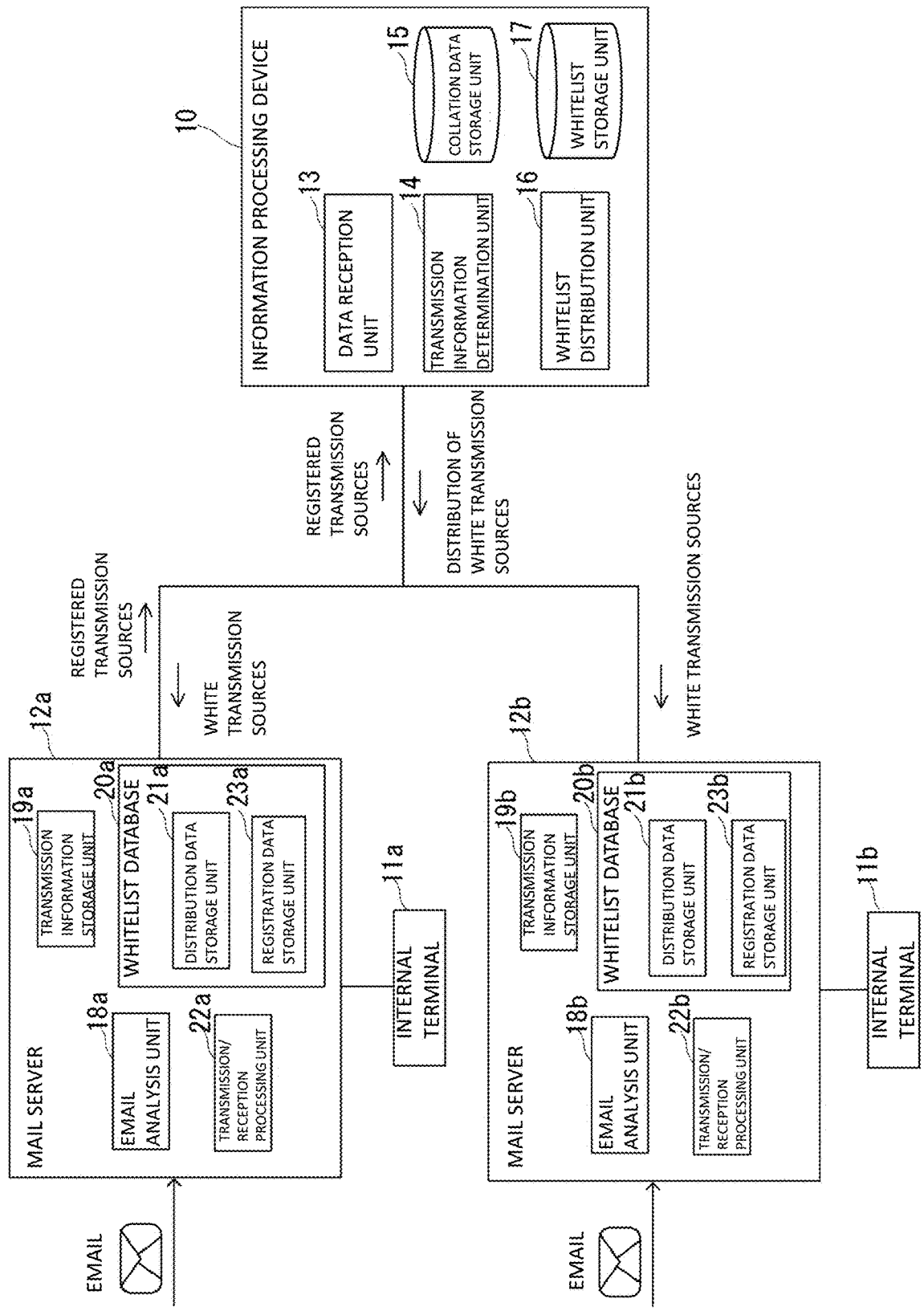
FIG. 6 is a configuration diagram that illustrates an example of a configuration of an email system to which an information processing device according to a second embodiment is applied.

FIG. 6 is a diagram that illustrates an example of a configuration of the information processing device 10 according to the second embodiment. In FIG. 6, parts having the same configuration or function as that of the first embodiment (FIG. 1) are denoted by the same reference numerals, and duplicate description will be omitted.

In the information processing device 10 according to the second embodiment, the information processing device 10 receive the domains of the transmission source mail addresses and the transmission source IP addresses registered by the users of the internal terminals 11 or the administrators of the mail servers 12, and distributes the registered domains of the transmission source mail addresses and the registered transmission source IP addresses as appropriate transmission sources to each of the mail servers 12.

A specific configuration will be described.

The whitelist database 20 of the mail server 12 further has a registration data storage unit 23 in which stored are combinations of the domains of the transmission source mail addresses and the transmission source IP addresses that are appropriate transmission sources of emails registered by the users of the internal terminals 11 or the administrators of the mail servers 12.

Note that the user of the internal terminal 11 (or the administrator of the mail server 12) causes a registration screen for registering transmission sources to be displayed on the terminal, and registers a transmission source including a combination of domain of a transmission source mail address and a transmission source IP address. The registered transmission source is stored in the registration data storage unit 23.

The registration screen displayed on the user terminal may be configured to be capable of displaying the registration data of the transmission sources already registered in the registration data storage unit 23 of the whitelist database 20. At this time, the registration data of the transmission sources stored in the registration data storage unit 23 may be compared and collated with the distribution data of the transmission sources distributed from the information processing device 10 and stored in the distribution data storage unit 21, and the registration data matching the distribution data may be displayed such that the user can recognize the registration data being stored as distribution data (for example, the registration data matching the distribution data is displayed with an identification mark).

The data reception unit 13 accepts, from the mail servers 12, transmission sources registered by the users, which include combinations of domains of transmission source mail addresses and transmission source IP addresses. Note that at the time of transmitting transmission sources to the information processing device 10, each of the mail servers 12 may add identification information for identifying the mail server 12 to the transmission sources. As a result, the information processing device 10 can identify from which mail server 12 each of the accepted transmission source has been transmitted.

The data reception unit 13 may accept a combination of domain of one transmission source mail address and a plurality of transmission source IP addresses associated with each other and registered by the user. For example, as shown in No. 3 of FIG. 4, the data reception unit 13 accepts one domain in association with transmission source IP addresses specifying a specific address range using Classless Inter-Domain Routing (CIDR).

The transmission information determination unit 14 determines whether this transmission source is appropriate based on the accepted combination of the domain of the transmission source mail address and the transmission source IP address. Specifically, the transmission information determination unit 14 determines whether this transmission source is appropriate by collating the accepted domain of the transmission source mail address and the accepted transmission source IP address with the malicious information stored in the collation data storage unit 15.

A whitelist storage unit 17 has the transmission sources determined to be appropriate stored therein. Note that the transmission information determination unit 14 may not necessarily determine whether the domain of the transmission source mail address and the transmission source IP address registered by the user (or the administrator) in the mail server 12 and accepted by the data reception unit 13 are appropriate, but the domain of the transmission source mail address and the transmission source IP address accepted by the data reception unit 13 may be stored in the whitelist storage unit 17.

The whitelist distribution unit 16 distributes the transmission source stored in the whitelist storage unit 17 to each of the mail servers 12 including the mail server 12 related to the registration of the transmission source. Note that the whitelist distribution unit 16 may distribute a transmission source to each of the plurality of mail servers 12 each time the transmission source is stored in the whitelist storage unit 17, or may distribute all the data of the transmission sources stored in the whitelist storage unit 17 at regular intervals. Otherwise, the information processing device 10 may accept a distribution request from the mail server 12 and distribute all the data of the transmission sources stored in the whitelist storage unit 17.

A distribution method in the second embodiment will be specifically described with reference to FIG. 6. When a transmission source including a combination of a domain of a transmission source mail address and a transmission source IP address is registered in a registration data storage unit 23*a* in a mail server 12*a*, this transmission source is transmitted to the information processing device 10. The transmission information determination unit 14 of the information processing device 10 determines whether the transmitted domain and transmission source IP address are appropriate. When it is determined that the transmission source is appropriate, the whitelist distribution unit 16 transmits this transmission source to the mail servers 12*a* and 12*b*. Each of the mail servers 12*a* and 12*b* stores the transmitted transmission source in distribution data storage units 21*a* and 21*b*, respectively.

Subsequently, the operations of the information processing device 10 according to the second embodiment will be described.

Figure 7:
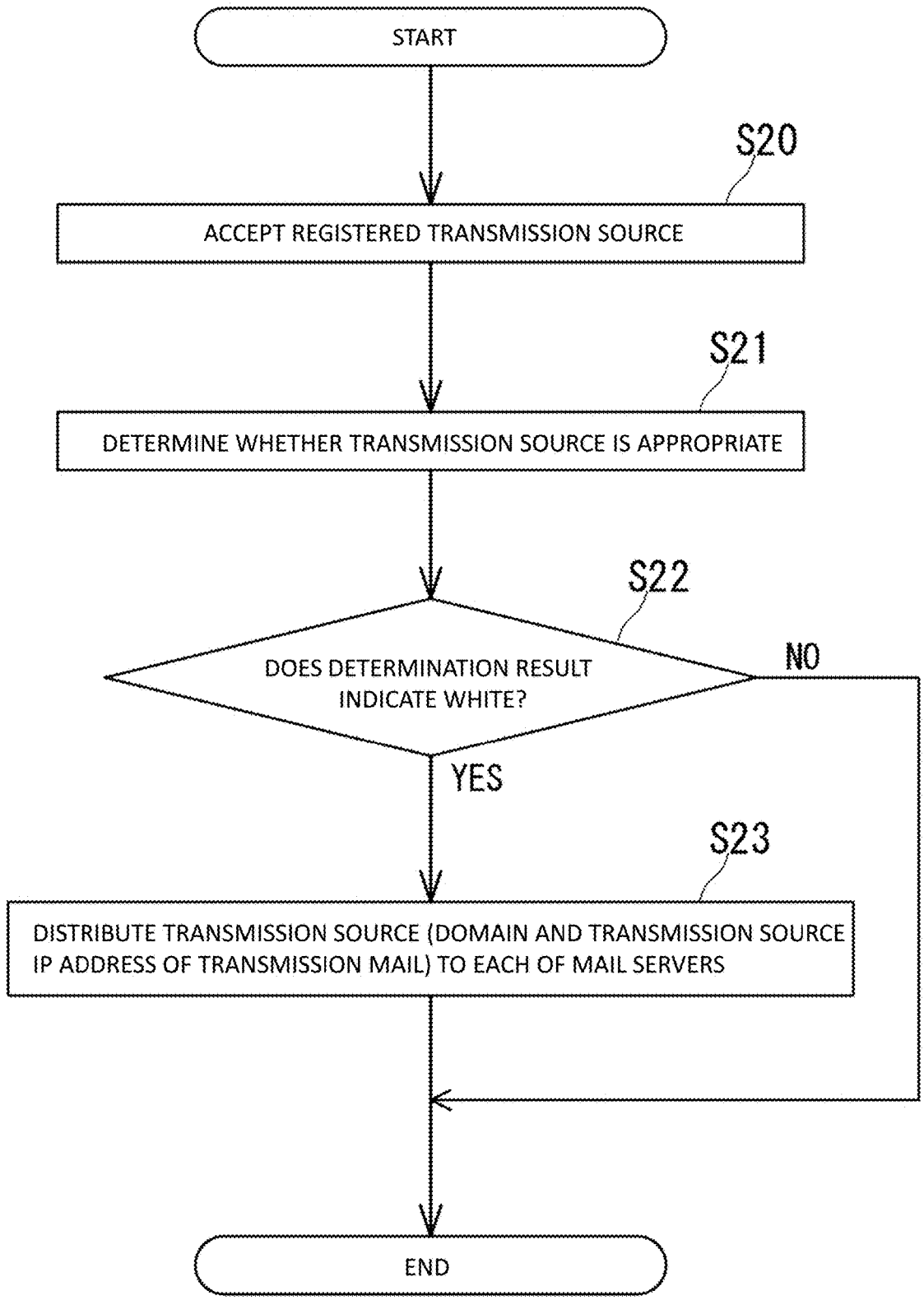
FIG. 7 is a flowchart that illustrates an example of an information processing method according to the second embodiment.

FIG. 7 is a flowchart that illustrates an example of an information processing method according to the second embodiment (see FIG. 6 as appropriate).

The data reception unit 13 accepts a transmission source registered by the user, which includes a combination of a domain of a transmission source mail address and a transmission source IP address (S20).

The transmission information determination unit 14 determines whether this transmission source is appropriate based on the accepted combination of the domain of the source mail address and the source IP address (S21).

The whitelist distribution unit 16 distributes the transmission source (the domain of the mail and the transmission source IP address) determined to be appropriate to each of the mail servers 12*a* and 12*b* including the mail server 12 related to the registration of the transmission source by the user (S22: YES, S23). The whitelist distribution unit 16 may distribute all the data of the transmission sources stored in the whitelist storage unit 17 at regular intervals. On the other hand, if the transmission source is not determined to be appropriate, the whitelist distribution unit 16 does not distribute the transmission source to the mail servers 12 (S22: NO).

The information processing device 10 according to the second embodiment distributes transmission sources registered by the users to the mail servers 12 so that white transmission sources can be immediately shared between the plurality of mail servers and a list of widely collected white transmission sources can be made.

Note that the information processing device 10 according to the second embodiment may be combined with the configuration of the information processing device 10 in the first embodiment, that is, the configuration of collecting and distributing transmission sources determined to be white based on the transmission information of emails actually received by the plurality of mail servers 12.

According to the information processing devices of the above-described embodiments, it is possible to collect appropriate transmission sources of emails quickly and widely by determining the transmission sources of the emails to be appropriate based on the transmission information extracted from each of the mail servers and distributing the transmission sources to each of the mail servers, and it is possible to prevent fraudulent acts such as email spoofing by grasping the transmission sources more timely and accurately than in SPF authentication.

The programs to be executed by the information processing device 10 are provided by being incorporated in advance in a storage circuit such as a ROM. Alternatively, the programs may be provided as a file in an installable or executable format stored on a computer-readable storage medium such as a CD-ROM, CD-R, memory card, DVD, or flexible disk. The programs to be executed by the information processing device 10 may be stored on a computer connected to a network such as the Internet and provided by downloading via the network.

Although some embodiments of the present invention have been described, these embodiments are presented as examples and are not intended to limit the scope of the invention. These novel embodiments can be implemented in various other modes, and various omissions, replacements, and changes can be made without departing from the gist of the invention. These embodiments and modifications thereof are included in the scope of the invention and the gist thereof as well as the invention described in the claims and the equivalent scope thereof.

REFERENCE SIGNS LIST

10 Information processing device
11 Internal terminal

12 Mail server
13 Data reception unit
14 Transmission information determination unit
15 Collation data storage unit
16 Whitelist distribution unit
17 Whitelist storage unit
18 Email analysis unit
19 Transmission information storage unit
20 Whitelist database
21 Distribution data storage unit
22 Transmission/reception processing unit
23 Registration data storage unit

The invention claimed is:

1. An information processing device comprising a processor: the processor being configured to:
  accept transmission information of an email received by each of a plurality of mail servers, the transmission information being extracted from the email;
  determine whether a transmission source of the email is appropriate based on the transmission information, wherein the transmission source includes a combination of a domain of a transmission source mail address and a transmission source IP address; and
  distribute the transmission source determined to be appropriate to each of the plurality of mail servers.

2. The information processing device according to claim 1, wherein
  the transmission information includes various kinds of information related to transmission in the received email,
  the information processing device comprises a collation data storage unit that stores harmful malicious information in advance for each of the transmission information, and
  the processor is configured to collate the accepted transmission information with the malicious information to determine whether the transmission source of the email is appropriate.

3. The information processing device according to claim 1, wherein,
  if there is a match in the transmission source included in the transmission information among a plurality of the transmission information accepted from the plurality of mail servers, the processor is configured to determine the transmission source to be appropriate.

4. The information processing device according to claim 2, comprising a whitelist storage unit in which the transmission source determined to be appropriate is stored, wherein
  the processor is configured to collate the stored transmission source with the malicious information, and to update a result of determination on whether the transmission source is appropriate.

5. The information processing device according to claim 1, wherein
  the processor is configured to accept the transmission source including the combination of the domain of the transmission source mail address and the transmission source IP address registered by a user, and distribute the transmission source to each of the mail servers.

6. An information processing device comprising a processor: the processor being configured to:
  accept a transmission source including a combination of a domain of a transmission source mail address and a transmission source IP address registered by a user in each of a plurality of mail servers;
  determine whether the accepted transmission source including the combination of the domain of the transmission source mail address and the transmission source IP address are appropriate; and
  distribute the transmission source determined to be appropriate to each of the mail servers.

7. The information processing device according to claim 6, wherein
  the processor is configured to accept the transmission source including a combination of one domain of mail and a plurality of transmission source IP addresses registered by the user.

8. An information processing method comprising:
  a step of accepting transmission information of an email received by each of a plurality of mail servers, the transmission information being extracted from the email;
  a step of determining whether a domain of a transmission source and a transmission source IP address of the email is appropriate based on the transmission information; and
  a step of distributing the domain of the transmission source and the transmission source IP address determined to be appropriate to each of the plurality of mail servers.

* * * * *